Nov. 15, 1960          P. J. SWEENEY ET AL          2,959,956
         APPARATUS FOR MEASURING THE AMPLITUDE AND DIRECTION
                       OF ANGULAR OSCILLATIONS
Filed Oct. 1, 1956                                  2 Sheets-Sheet 1
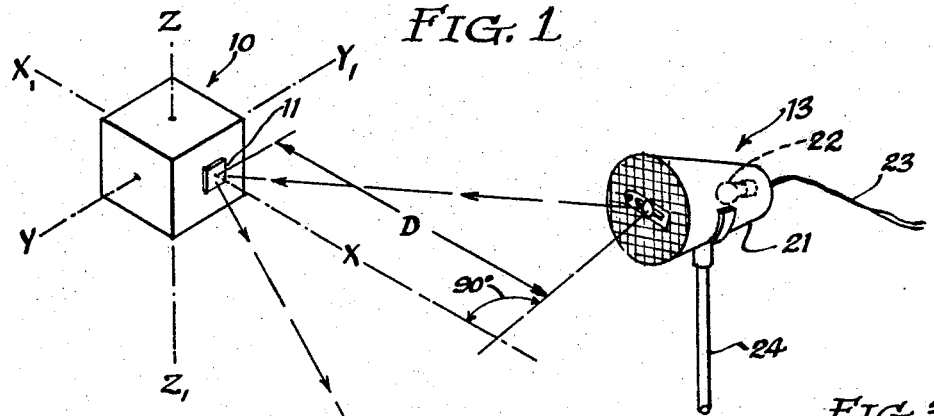
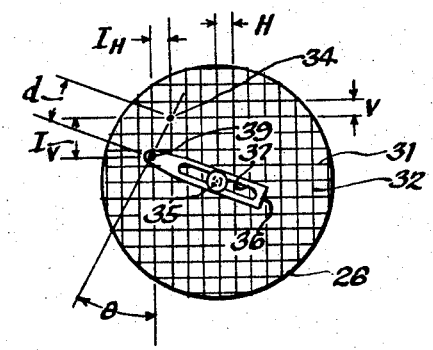
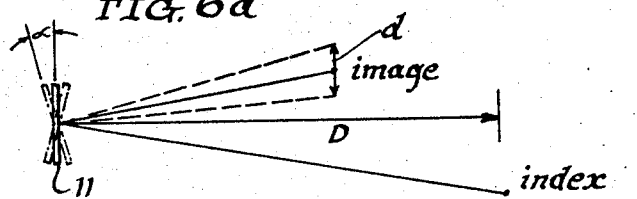
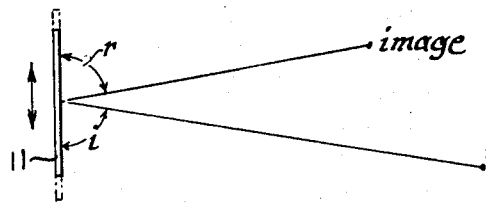
INVENTORS
Clifford J. Shoemaker
Philip J. Sweeney
James P. Monroe
by Leonard S. Knox
Attorney United States Patent Office 2,959,956
Patented Nov. 15, 1960

2,959,956

APPARATUS FOR MEASURING THE AMPLITUDE AND DIRECTION OF ANGULAR OSCILLATIONS

Philip J. Sweeney, Clifford J. Shoemaker, and James P. Monroe, Grand Rapids, Mich., assignors to Lear, Incorporated, Grand Rapids, Mich., a corporation of Illinois Filed Oct. 1, 1956, Ser. No. 613,274

4 Claims. (Cl. 73—71.3)

This invention relates to apparatus for measuring the amplitude and direction of oscillations of a vibrating body.

In the shock mounting of certain types of instruments and apparatus it is important to confine movement of the same to strictly translational paths and to neutralize any tendency thereof to vibrate in a rotational mode. For example, in the case of a gyroscope, which is an instrument performing its functions solely because of rotational displacement of its gimbals with respect to a reference, any rotational displacement of the gyro relative to its reference is tantamount to shifting of the frame of reference thereby giving rise to false precessional couples defeating the intended function. Gyroscopes forming part of aerial navigational equipment, such as automatic pilots, horizon indicators and so forth are of this class.

It is a fairly simple matter to test the efficacy of a shockmount together with its instrument to determine the resistance of the mount to externally applied torques as, for example, by the use of a machine which simulates the behaviour of an air frame when vibrated in various modes. Any correction required in the shockmount may then be introduced under conditions analogous to those likely to be encountered in practice. However, to detect and measure displacements of the mounted instrument introduces some special problems, for the reason that any mass, even small, added to the instrument assembly will, under vibration, alter the behaviour. Accordingly, conventional designs of vibration indicators adapted to be mounted directly to the shockmounted body introduce differences in the moment of inertia about the various axes. It follows that behaviour of the body without the attached indicator can, and nearly always is substantially different that that of the body with the attached indicator.

Our invention has for its principal object the measurement of displacements of a vibrating body which does not depend upon the mounting on the body of instrumentalities of such mass as will adversely affect the verity of the readings.

Another object is to provide displacement-measuring means as aforesaid which give direct visual indication of the amplitude and direction of the displacement thereby to eliminate the making of photographic or other records which must be interpreted subsequently.

Still another object is to provide means as aforesaid which is capable of deriving the necessary visual indication to various degrees of accuracy depending upon the particular requirements.

A further object is to provide means in accordance with the foregoing which is inexpensive to build and which is not subject to misadjustment during ordinary handling and operation.

Other objects will appear from the ensuing description which, taken with the accompanying drawing, discloses preferred forms which the invention may assume in practice.

In this drawing:

Fig. 1 is a perspective view of apparatus in accordance with this invention;

Fig. 2 is a front elevation of the reading panel of the apparatus of Fig. 1;

Fig. 3 is a detail to show the reflected image of the index spot;

Fig. 4 is a front elevation of the reading panel of a modified form of apparatus;

Fig. 5 is a detail to show the reflected image of the index spots of the form of reading panel of Fig. 4;

Figs. 6a and 6b are schematic representations to illustrate the response of the apparatus to angular vibration and its indifference to translational vibration;

Figure 7A:
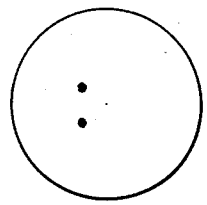
Figs. 7a, 7b and 7c illustrate schematically the various types of images resulting from angular vibration resolved on a plane parallel to the axis of the mirror.

In a broad sense the invention comprehends the mounting on the vibrating mass of a mirror having such dimensions as to leave the moment of inertia virtually unchanged. A reading panel is supported at some point spaced a predetermined distance from the mirror and carries dot-like indices arranged to be illuminated although illumination is not indispensable. In one form of the invention a pair of adjustable indices is utilized to provide reflections thereof in the vibrating mirror which are blurred traces of rectilinear form. By viewing the reflected traces the direction and amplitude of the displacement of the vibrating mass can be correlated with the static adjusted position of the indices and a reading obtained. In another form a series of fixedly spaced apart indices are used and similar reflections are correlated with the fixed spacing to obtain the same result.

Turning to the drawing, there is shown a mass 10, assumed to be a gyroscope and its appurtenant gimbals as included, for example, in a navigational aid. The gyroscope is to be understood as being mounted in a frame which is, in turn, secured to a test table having purely translational vibration. The mass 10 usually is an instrument which is shock mounted with respect to the frame through resilient elements and is desired to respond to translational vibration transmitted from the frame through the resilient mounting with a purely translational response. Moreover, it will be understood that the means for mounting the mass in its frame, including any vibration isolator, shock absorbent and damping means is desirably to be designed as to prevent, to the greatest practical degree, torques generated in the mounting from affecting the mass. Obviously such torques, regardless of the axis about which they may be severally evidenced, may always be resolved into torques about one or more of the orthogonal axes X—$X_1$, Y—$Y_1$ and Z—$Z_1$. Consequently in what follows the direction and magnitude of rotation displacement will be considered as capable of being referred to a particular one or ones of these three axes and correction introduced accordingly. Such transformation of axes is well-known and will therefore not be elaborated upon herein.

Upon a selected side of the mass 10 a minute section of mirror 11 is fastened as by cement or adhesive tape and, at a specified distance D there is positioned the reading panel unit 13. Mirror 11 may be a light gauge, first surface, glass mirror or a thin piece of polished metal in order not to introduce any alien mass into the assembly. A commercial grade mirror should not be used since errors in refraction will introduce errors in reading. As will appear the distance D is selected at random to provide a sensible reflection in the mirror 11. Too short a distance D will cause difficulty in interpretation while too great a distance requires that the operator be too close to the mirror.

The unit 13 comprises a housing 21 encasing a lamp bulb 22 energized through a cord 23. A convenient standard 24 supports the unit on the floor at a height such that the axis of illumination is substantially at the same elevation as the mirror 11.

The front of the housing is closed by a reading panel 26 (Fig. 2) of translucent material criss-crossed by a grid of inscribed lines, the horizontal ones, i.e. ordinates, being indicated at 31 and the vertical ones, i.e. abscissae at 32. At some intersection of the coordinates 31 and 32 a fixed marker or index 34 is inscribed. This may be a small dot of crayon for ease in erasure, and is located in such position with respect to the movable index to be described as to provide a reflected trace of readable nature.

At the center of the panel 26 there is provided a stud 35 carrying an index arm 36 having a slot 37. At its end the arm 36 is provided with a second permanent marker 39. A friction joint is provided intermediate the arm and stud in order that the arm may be adjusted to locate the marker 39 at any desired distance from the marker 34, the slot 37 permitting radial and circular movement of the marker 39.

Operation will now be described. Assuming the lamp 22 is on and the mass 10 is at rest an observer at O will see the markers 34 and 39 reflected in the mirror 11 as a pair of black dots at some indiscriminate spacing $d$ (Fig. 7a). As will appear adjustment of the distance $d$ is made after the mass is set into vibration.

Figure 7B:
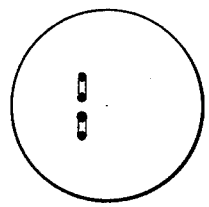

The vibrating table upon which the instrument is supported for testing is now set into motion and the mass 10, represented by a shock mounted gyroscope or other device, will enter upon a vibrational mode which will be different from that of the table and from which the directions and magnitudes of displacements other than translational are to be segregated. At this time each marker 34 and 39 will be seen as a distinct trace in the mirror, namely as elongated flat ovals having the major axis at some angle i.e. the angle is formed by the line of the major axis and a vertical axis (Fig. 7b). The length of that major axis bears a definite relation to the amplitude of oscillation of the mirror 11, i.e. the mass 10 and the direction of the axis will lie on a path so related to the plane of the mirror as to be capable of reference to any desired axis or pair of axes, e.g. the axis Y—$Y_1$ and Z—$Z_1$. If the vibration is about the Y—$Y_1$ axis, then both traces will be seen as if parallel to Z—$Z_1$, as in Fig. 7b. At this juncture it will be understood that a marker which is black will exhibit itself as a trace T having a light gray practically throughout the length of the oval, deeper gray at the ends E and, where the two traces are overlapped, the image is black, B. It will be understood that each trace represents substantially simple harmonic motion and that where the velocity is maximum the trace will be lightest and vice versa.

Figure 7C:
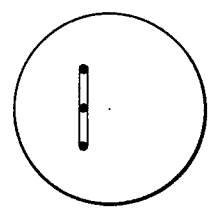

The relative position of the markers 34 and 39 is adjusted to cause the adjacent ends of the separate traces to overlap, i.e. until the pattern of Fig. 7c results, or with a circular overlap B of greatest intensity. Under these conditions the amplitude of oscillation is represented by the adjusted distance $d$ between the markers and its angle with a vertical axis as $\theta$. If there is rotational vibration about a pair of axes say Y—$Y_1$ and Z—$Z_1$ then $\theta$ will be some angle other than 0° and the traces will yield an image as in Fig. 3. From this it will be apparent that the angular amplitude of oscillation is ½ arc sin $$\frac{d}{D}$$

The distance $d$ may be read as $\frac{1}{2}\sqrt{I_H^2+I_V^2}$ by reference to the grid lines 31 and 32. Since these ordinates will be some fixed distance apart and close enough to justify their use as graduations the dimensions $I_H$ and $I_V$ may be read directly with no appreciable error. It will be apparent that, since Fig. 3 shows a reflected image, the angle $\theta$ is indicated oppositely from that shown in Fig. 2.

Figs. 6a and 6b have been included to provide a clearer understanding of the principles of the invention. In Fig. 6a the mirror 11 is shown in edgewise aspect and undergoing angular oscillations $\beta$ about the axis Y—$Y_1$. Thus the images of the indices are elongated paths, as explained. In Fig. 6b the mirror 11 is shown as undergoing purely translational movement and since the angle of incidence $i$ is always equal to the angle of reflection $r$ the indices 34 and 39 will be seen as undistorted images. For convenience of representation the plane including the observer's eye and the axis X—$X_1$ has been rotated 90° in Figs. 6a and 6b.

From the foregoing it will have become apparent that the apparatus may be identically employed with respect to vibrational behaviour referred to other axes or pairs of axes simply by mounting the mirror 11 as required and locating the device 13 accordingly.

Figure 8A:
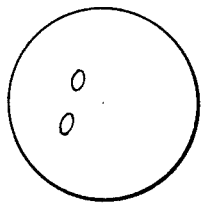
Figs. 8a, 8b and 8c are similar to the preceding figures except that here the angular vibration is not resolved on a plane parallel to the axis of the mirror.
Figure 8B:
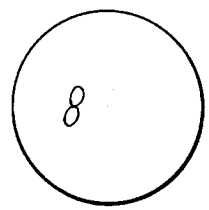
Figure 8C:
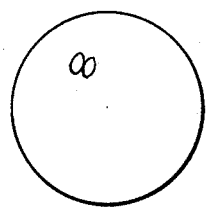

Depending upon the phase relationship of the motions about the two axes being measured the traces as seen in the mirror may be ellipses rather than the straight lines. An example of this behaviour is shown in Figs. 8a to 8c. In Fig. 8a the separate image paths of the two indices are seen separately prior to adjustment of the indices. In Fig. 8b the major axis of the ellipse is measured by adjusting the movable index to cause overlap of the ellipses with their major axes aligned. In such case the major axis is measured as say $d_1$. In Fig. 8c the minor axis is measured similarly, following adjustment of the movable index, as say $d_2$.

In Figs. 4 and 5 we have shown a modified form of apparatus which differs from that heretofore described only in the nature of the reading panel. In this case the panel or disc 26a is opaque, painted black on the exterior, and is perforated by a diametrical row of holes 41 of some convenient pitch. Moreover the disc is rotatably adjustable in the housing 21 to dispose the row of holes at an angle providing a usable reading as will now appear.

In general the preceding explanation with respect to the form of the invention shown in Figs. 1 to 3 will apply to that of Figs. 4 and 5. However, in the latter case light emitted through the holes 41 is seen in the mirror as a plurality of streaks against a dark background, as in Fig. 5. For clarity of rendition, and to avoid the use of a large black area on the drawing, the showing of Fig. 5 illustrates the images as dark traces on a light background.

In the presence of angular motions the image is interpreted as follows: the bottom of the left-hand trace (reversed in Fig. 5, as it would appear to the observer), which is used as a reference is compared with the top ends of the remaining traces. It is seen that the bottom of the reference trace is about even, in a vertical sense, with the top of the third trace to the right of it (reversed in Fig. 5). In this case the angular motion about the Y—$Y_1$ axis, indicated as $I_V$, would be approximately equal to three times that represented by the vertical spacing V (Fig. 4.) By the same process the component about the Z—$Z_1$ axis, indicated by $I_H$, may be determined.

The plane of the mirror should be perpendicular to the axis through the surface upon which it is mounted and the reading panel should, to the greatest practical extent, lie on that axis. The sensitivity of the apparatus may be increased since, by increasing the mirror-to-panel distance D, a given trace length as seen in the mirror will represent a smaller angle.

From the preceding it will have been seen that the invention arrangement is simple, inexpensive, portable, direct reading and extremely accurate for measuring minute angular motions of a vibrating body and does not subject the body to outside loading which would interfere with the desired result.

While we have shown particular embodiments of our invention, it will be understood, of course, that we do not wish to be limited thereto since many modifications may be made and we therefore contemplate to cover any such modifications as fall within the true spirit and scope of our invention as defined by the appended claims.

We claim:

1. Apparatus for visually determining the amplitude and direction of angular oscillations of a vibrating body comprising a mirror mounted on the body with its reflecting surface parallel to the plane in which the direction of the oscillations is to be resolved and measured, a pair of indices and means to position the same to be reflected in the mirror and observable by the operator, and means for adjusting, during vibration of said body, the position of at least one of said indices in a plane normal to the line of sight from said indices to said mirror whereby the images of said indices may be made to have the adjacent ends overlap, the axis of alignment representing the direction of the resolved oscillation about an axis normal to said mirror, and the length of either image of said indices being a function of the amplitude of vibration.

2. Apparatus in accordance with claim 1 further characterized by a translucent panel providing a background for said indices, means for transilluminating said panel, and wherein said indices are adjacent said panel.

3. Apparatus for visually determining the amplitude and direction of angular oscillation of a vibrating body comprising a mirror adapted to be mounted on the body with its reflecting surface parallel to the plane in which the direction of the oscillations is to be resolved and measured, a lamp housing including a lamp and a translucent panel forming one wall of the housing for transillumination by the lamp, means for positioning said panel at a predetermined distance from the mirror, a fixed opaque dot-like marker on said panel, an arm adjustably mounted on said panel for positioning of one end thereof at varying distances from said fixed marker, a second opaque marker on said one end, the oscillating reflection of said markers in said mirror representing the direction and amplitude of the oscillations when the separate reflected image loci of the markers are, by adjustment of the second marker in a plane normal to the line of sight from said markers to said mirror, aligned on a common longitudinal axis and are overlapped a predetermined amount.

4. Apparatus in accordance with claim 3 further characterized by the provision of coordinate lines on said panel.

References Cited in the file of this patent

UNITED STATES PATENTS

| | | |
|---|---|---|
| 2,293,288 | Gadd | Aug. 18, 1942 |
| 2,361,349 | Frazier | Oct. 24, 1944 |

FOREIGN PATENTS

| | | |
|---|---|---|
| 553,518 | Great Britain | May 25, 1943 |